Jan. 27. 1925.
W. E. CRAWFORD
WEEDER
Filed Aug. 3, 1923
1,524,509
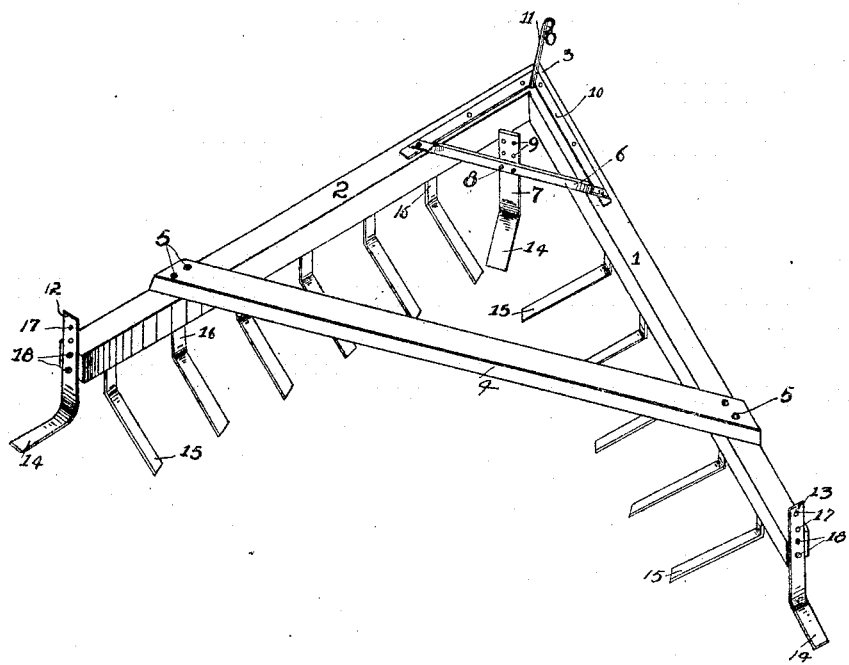
Inventor
William E. Crawford,
per
Aaron & Aaron,
Attorneys.

Patented Jan. 27, 1925.

1,524,509

UNITED STATES PATENT OFFICE.

WILLIAM EMERSON CRAWFORD, OF HAVRE, MONTANA.

WEEDER.

Application filed August 3, 1923. Serial No. 655,408.

*To all whom it may concern:*

Be it known that I, WILLIAM E. CRAWFORD, a citizen of the United States, residing at Havre, in the county of Hill and State of Montana, have invented a certain new and useful Improvement in Weeders, of which the following is a full, clear, and exact description of the same.

The present invention relates to weeding machines and comprehends a machine of this character capable of extracting weeds and the like in a very efficacious manner, the machine requiring comparatively low traction power to draw the same.

The construction and operation of my invention will be readily understood by the following description in connection with the accompanying drawings, wherein:

The figure is a top plan view of a weeding machine constructed in accordance with my invention.

The frame of the machine comprises side members 1 and 2 converging at point 3. The said side members are held in spaced relation by the brace 4, the terminals of which are fastened to the side members 1 and 2 as at 5. A bar 6 extends transversely of the forward extremity of the side members 1 and 2 in close proximity to their junction and serves to support the gauge member 7, which is connected thereto, by means of bolts 8, 8, as shown. Gauge member 7 is provided with sets of perforations 9 to adjust the same vertically.

The numeral 10 denotes a brace plate connected over the side members 1 and 2, and over the same a clevis 11 is mounted, as shown.

The frame of the machine is supported above the surface of the ground by gauge members 7, 12 and 13, terminated by horizontal shoes 14 integrally formed therewith. The gauge members 12 and 13 are provided with a row of perforations 17 formed in their upright portion to receive bolts 18, securing them to members 1 and 2.

It will be seen that the gauge members are vertically adjustable by utilizing different perforations.

Cutting knives, denoted by the numerals 15, are fastened under the side members 1 and 2 by means of bolts, not shown. The said cutting knives are preferably made of steel, and comprise a vertical portion 16 and a cutting portion 15. The cutting portion 15 forms a knife blade.

The cutting knives are mounted in spaced relation and are disposed at acute angles in relation to the draught line. The disposition of the cutting knives in this manner has proven very effective in severing and extracting noxious vegetation and facilitates traction of the machine.

In operation, the machine may be drawn by draft animals or motive traction power, as desired. Prior to operation, the cutting knives may be adjusted in relation to the surface of the ground, as required, through the medium of the adjustable gauge members 7, 12 and 13 in the manner previously described.

I am aware that cultivators provided with cutting knives mounted diagonally of the draught line are in use and I do not claim such construction, but what I claim is:

Claims:

1. A machine of the character described, constituting a frame having braced side members diverging from a point of junction, standards supporting the said frame having a row of perforations to adjust the same vertically, knives mounted upon the side members disposed in parallelism and at acute angles in relation to the draught line and a clevis on said frame positioned at the point of junction of the said side members to connect the traction power.

2. In a weeder of the class described, a frame comprising side bars disposed diagonally to the line of draught, cross braces bolted to said side bars to maintain them in position, a draught connection positioned at the juncture of the side bars, a plurality of cutters bolted on said side bars and having their cutting portion extending inside the same and at right angle thereto, means to gage the depth of the cutting knives comprising adjustable dragging shoes having upright fastening portions bent at right angle thereto, perforations along said upright portions to enable the vertical adjustment thereof, and bolts to secure the said portions to the frame.

Havre, Mont., this 29 day of Jan., 1923.

WILLIAM EMERSON CRAWFORD.

In the presence of—
R. J. HAMPTON,
W. G. McLENNAN.